United States Patent
Foster

[11] 3,752,236
[45] Aug. 14, 1973

[54] CHANGEABLE PLOW SWEEP

[76] Inventor: Clifford R. Foster, RFD 2, Avoca, Tex. 79503

[22] Filed: May 19, 1971

[21] Appl. No.: 94,489

[52] U.S. Cl.................. 172/751, 172/753, 172/763
[51] Int. Cl............................................. A01b 15/00
[58] Field of Search.................... 172/751, 749, 750, 172/753, 762, 763, 772, 721, 699

[56] References Cited
UNITED STATES PATENTS

| 2,020,841 | 11/1935 | Lier | 172/749 X |
| 670,017 | 3/1901 | Gilman et al. | 172/753 X |
| 340,621 | 4/1886 | Roberts | 172/762 X |
| 1,250,472 | 12/1917 | Kirkpatrick | 172/750 X |
| 2,634,664 | 4/1953 | Benner | 172/749 |

Primary Examiner—Robert E. Pulfrey
Assistant Examiner—Stephen C. Pellegrino
Attorney—Marcus L. Bates

[57] ABSTRACT

A changeable plow sweep comprising a shank adjustably affixed to a frog in a manner which enables the relative angle between V-shaped blades to the sweep and the frog to be adjusted.

The frog includes a laterally disposed groove formed in the forward edge portion thereof which receives a rear marginal edge portion of the sweep blade therein. A relatively flexible rod is abuttingly received against the frog and is placed into engagement with the sweep blades so as to removably affix the blade to the frog.

7 Claims, 3 Drawing Figures

Patented Aug. 14, 1973 3,752,236

CLIFFORD R. FOSTER
INVENTOR

CHANGEABLE PLOW SWEEP

SUMMARY OF THE INVENTION

This invention specifically relates to a changeable plow sweep which includes a new combination of a shank, frog, and V-shaped sweep blades which enables the blade to be rapidly and removably affixed to the frog in a new and unobvious manner. The frog is adjustably and removably affixed to a shank with a sloped portion of the frog contacting a bolt located in a slot of the shank so that the angular disposition of the blade or cutting sweep relative to the ground can be adjusted, and further so that the cutting sweep and frog will "trip" or be forced into a non-plowing configuration should the sweep be overloaded.

The frog has double recessed flanges at the forward edge portion thereof which form a groove within which the rearward longitudinally extending marginal edge portion of the V-shaped cutting sweep is received. Each arm of the blade is apertured so that a rod can be placed behind the frog with the depending ends of the rod being received by the apertures within the blade.

Accordingly, a primary object of this invention is the provision of a sweep assembly having a quick changeable blade thereon.

This invention generally relates to cultivator and/or other plow sweeps used in any normal farming or soil moving operation.

An object of the invention is to provide a quick changeable sweep, easy to remove and replace when desired, at lower cost per unit and a less expensive, easily constructed footpiece, which will hold this economy sweep in place.

Another object of this invention is to provide improvements in changeable plow sweep blades which include means by which a blade can be rapidly and easily replaced.

A further object of this invention is to provide a combination shank, frog, and blade assembly having improvements therein which enables the blade of the sweep assembly to be adjusted relative to the ground.

A still further object of this invention is to provide a frog for attachment of a sweep blade to a shank which enables the blade to be forced into a non-plowing position should the sweep be overloaded.

Another advantage of the invention is to provide a less expensive cutting edge sweep—and foot, in order that the operator may change sweep shape in a very brief time, in the field and at a much lower cost than present standard sweeps; thus maintaining a sharp sweep at all times.

These, together with other objects and advantages apparent hereafter-reside in the details of construction more fully described hereafter. Reference is hereby made to the accompanying drawings forming a part hereof—wherein like numerals refer to like parts throughout, and in which.

Figure 2:
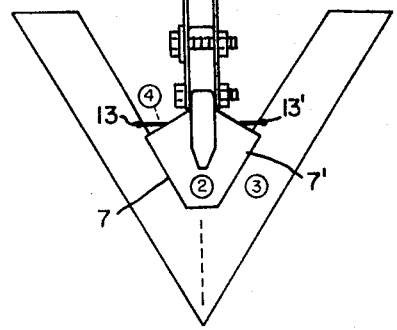
FIG. 2 shows front view of completely assembled sweep attached to economy foot.
Figure 3:
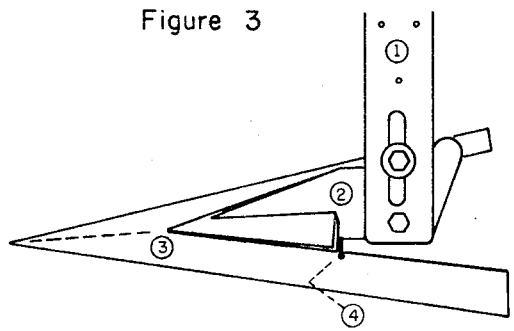
FIG. 3 shows side view sweep in place and lower portion economy foot.

As seen illustrated in the drawings, the plow sweep of FIG. 2 comprises a shank, generally illustrated by the numeral 1, having a circular opening at its lower end through which a fastener in the form of a bolt means 5 is received. A slot in the form of an opening 6 is spaced from and upwardly directed away from the circular hole.

A frog, generally illustrated by numeral 2, includes a V-shaped forward portion 7, 7' which terminate in spaced double recessed flanges 8, 8' at the forward side edges thereof with the flanges being spaced apart so as to form an outwardly opening groove therebetween. A rearwardly upwardly sloping wall or upper edge 9 of the frog, when assembled to the shank, contacts bolt 10 and presses thereagainst an amount which is proportional to the pressure applied to the point of the blades.

Circular opening 11 formed rearwardly of the frog receives the before mentioned bolt 5 therethrough.

The opened V-shaped cutting edge of the blade has a marginal edge portion 12 which slidably engages within the recessed area formed by the flanges of the frog. Openings at 13 on the inner marginal edge of each sweep blade receives the opposed ends of the relatively flexible locking rod or wire 4 therein. The locking wire abuts a rear portion of the frog so as to releasably maintain the blade affixed to the frog in a captured manner.

Figure 1:
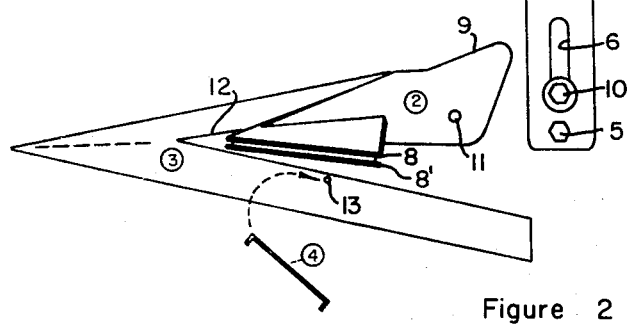
FIG. 1 shows side elevation with dis-assembled four main parts.

In carrying out of the invention, referring specifically to the drawings in FIG. 1, No. 3 V-shaped plow sweep with outer edge drawn sharp from the best available material, with holes on the inside edges of each sweep shape. (Holes being for the locking device), No. 2 Footpiece "frog" with double recessed (sweep holding) flanges (which holds V-shaped replacable sweep) with sloping upper edge on frog and with one hole in lower portion of frog.

No. 4 Tying device and sweep reinforcing device to lock on sweep.

No. 1 Footpiece shank to fit any desired plow clamp. Footpiece has one round hole at bottom and sloping slit hole just above round hole.

To assemble take No. 3 V-sweep shape and insert same into double recessed flanges of "frog" No. 2. Take No. 4 flexible tying, locking and reinforcing device and drop into holes in sweep, directly behind No 2 frog—thus holding sweep and strengthening same and enabling operator to "backup" without sweep coming off frog.

Take No. 1 footpiece shank and fasten shank to No. 2 frog at hole in frog with the bottom hole in footpiece either by bolt or rivet; then insert bolt (with washers and nut) through slit hole in shank No 1. The degree OF angle to this slit hole in shank No 1, determines the amount of pressure necessary to trip sweep; also determines set or angle of sweep. The greater degree of angle slope forward towards the top of the slit hole, determines the amount of pressure needed to "trip" sweep. The pressure on sloping edge of frog, pushes up on bolt in slit hole in shank No. 1—thereby tripping sweep to prevent damage to same. The bolt can then be loosened and sweep shape reset into desired position.

The foregoing is considered as illustrative only of the principals of the invention. Further, since numerous modifications and changes will readily occur to those skilled in the arts, it is not desired to limit the invention to the exact description and operation shown and described-and accordingly all suitable modifications and equivalents may be resorted to, falling within the scope of the invention as claimed.

Having thus completely and fully described the invention, what is now claimed as new is as follows:

1. A plow sweep comprising a shank having a circular opening at its lower end and a slotted opening closely adjacent and above said circular hole, a frog having a V-shaped forward portion with double recessed flanges at the side edges thereof, and a rearwardly, upwardly sloping upper edge, said frog further including a circular opening in the lower back portion thereof, means securing said frog to said shank through said circular openings, stop means extending through said slotted opening and abutting said sloping upper edge, an opened V-shaped cutting edge sweep blade having a portion thereof slidably engaged within the recessed flanges of said frog, said sweep having means forming an aperture on an inside edge portion of each sweep blade, and a relatively flexible locking means having a respective marginal end engaged with said aperture on each blade edge, said locking means having a body portion for engaging a rear portion of said frog to urge the blade into the recessed flanges of the frog.

2. The plow sweep of claim 1 wherein said shank includes spaced arms which receive said lower back portion of said frog therein, said slotted opening being arranged relative to said circular opening whereby rotation of said frog about the axis of said circular opening causes said stop means to be forced upwardly within said slot so that said upwardly sloping upper edge of said frog is rotated from within said spaced legs.

3. The plow sweep of claim 1 wherein said locking means is a longitudinally extending rod having the depending ends thereof bent back towards one another so that said bent ends, when inserted into the aperture of each said blade, maintains said blade affixed to said frog.

4. A changeable plow sweep assembly having a shank, a frog, and an opened V-shaped cutting sweep, the improvement comprising:
   said shank having a lower marginal end formed into parallel spaced walls thereby forming a cavity; means forming an aperture adjacent the free end portion of said walls, means forming a slot in said walls adjacent to said aperture;
   said frog having a groove formed in the leading edge portion thereof with said groove being of a configuration to receive a rearward marginal edge portion of the cutting sweep therein; locking means capturing said cutting sweep to said frog;
   said frog having a rearwardly directed portion thereof formed into a fastener sloping edge portion, spaced from means of said frog and received through the aperture of said walls of said shank; said rearwardly directed portion of said frog having a configuration which enables said rearwardly directed portion to be rotated into and out of said cavity;
   stop means movably attached to said means forming a slot with said sloping edge portion of said frog bearing against said stop means;
   whereby: said sloping edge portion of said frog, when sufficient pressure is exerted upon the cutting sweep, forces said stop means to move upwardly in said slot.

5. The plow sweep of claim 4, wherein
   said locking means including apertures formed in each said cutting sweep, an elongated member having the marginal depend-ing ends thereof received within the last said apertures with a marginal central portion of said member bearing against a rear por-tion of said frog.

6. The plow sweep of claim 4 wherein said means capturing said cutting sweep includes an elongated member having a central portion which can be brought to bear against a rear portion of said frog, and opposed end portions which can be brought to bear against opposed portions of said cutting sweep to thereby urge said cutting sweep into said groove.

7. The plow sweep assembly of claim 6 wherein said opposed portions of said cutting sweep are provided with apertures within which a marginal end portion of said elongated member is received, with said central portion thereof being abut-tingly received against a rear portion of said frog.

* * * * *